J. McBRIDE.
Side-Spring Vehicle.

No. 218,042. Patented July 29, 1879.

WITNESSES
Robert Everett
W. N. Severance

INVENTOR
John McBride
Gilmore Smith & Co.
ATTORNEYS

UNITED STATES PATENT OFFICE.

JOHN McBRIDE, OF STRATHROY, ONTARIO, CANADA.

IMPROVEMENT IN SIDE-SPRING VEHICLES.

Specification forming part of Letters Patent No. 218,042, dated July 29, 1879; application filed May 17, 1879.

*To all whom it may concern:*

Be it known that I, JOHN McBRIDE, of Strathroy, in the county of Middlesex, Province of Ontario, Canada, have invented certain new and useful Improvements in Carriages and Wagons; and I do hereby declare that the following is a full, clear, and exact description of the same, reference being had to the accompanying drawings, in which—

Figure 1:
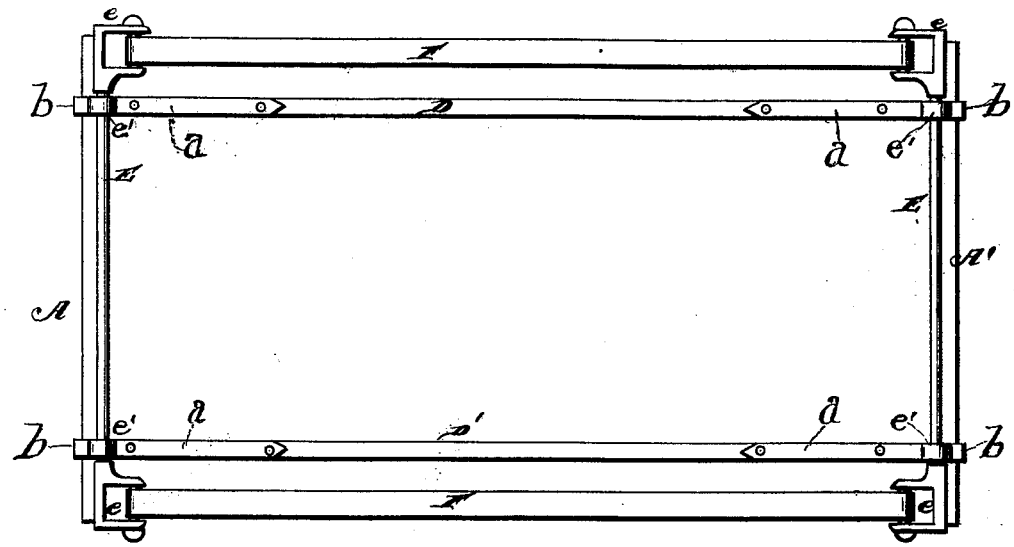
Figure 2:
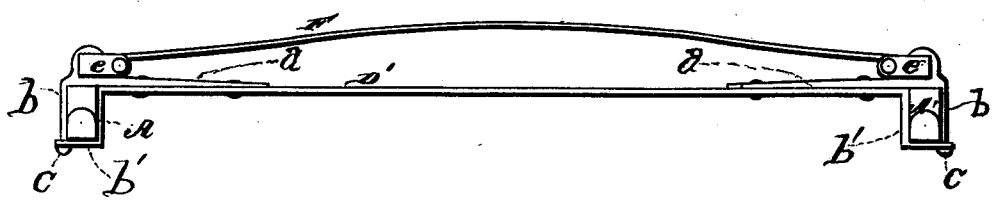

Figure 1 is a plan view of a portion of a vehicle embodying the improvements in my invention; and Fig. 2 is a side elevation of the same.

The invention has relation to carriages and wagons; and consists in the improvements in the construction of the same hereinafter fully described, and particularly pointed out in the claims.

Referring to the drawings, A designates the head-block, and A' the rear axle, of the vehicle. D D' represent two yielding reaches, which connect the head-block and axle A A'. These yielding reaches are preferably made of spring-steel, and are constructed so lightly as to be very elastic. They may be slightly curved or deflected from a straight line to cause them to be still more yielding.

The object of these yielding reaches is to so connect the front and rear axles as to neutralize any horizontal vibration of the axles, and prevent the same from being communicated from one to the other when either is jarred by their wheels striking an obstruction. For instance, should one of the front wheels strike an obstruction, the shock arising therefrom would not be communicated to the rear axle, owing to the yielding character of the reaches D D'.

The reaches D D' are provided with top plates *a*, having eyes *e'* and half-clips *b*, the said top plates *a* being secured to the reaches by bolts or rivets near each axle, as shown. The reaches D D' have half-clips *b'* at each end, and when the top plates are secured thereto the half-clips *b b'* encircle the head-block and axle A A', nuts or rivets *c* being employed to tighten them.

E E are bars provided at their ends with shackles *e* for receiving and retaining the body-bars or side springs, F, of the carriage. The bars or shafts E turn in the eyes *e'*, so that the weight that will operate one of the side springs, F, will operate the other side spring in unison therewith.

This construction provides an easy riding-carriage, by reason of the fact that the yielding reaches prevent shocks upon one axle from being communicated to the other; and, further, the weight in a body secured to the side springs, F, no matter at what point it is placed in the body of the vehicle, will depress or act upon the springs F simultaneously.

Having thus fully described my invention, what I claim as new and useful, and desire to secure by Letters Patent of the United States, is—

1. In the running-gear of a vehicle, the yielding reaches D D', provided with the half-clips *b'*, and top plates *a*, having half-clips *b*, adapted to encircle the head-block and axle A A', in combination with the said head-block and axle, as and for the purposes set forth.

2. In the running-gear of a vehicle, the combination of the yielding reaches D D', constructed as described, with the bars E, having shackles *e* at each end, and the side springs, F F, substantially as and for the purposes set forth.

In testimony that I claim the above I have hereunto subscribed my name in the presence of two witnesses.

JOHN McBRIDE.

Witnesses:
WM. P. LAND,
SAMUEL McBRIDE.